United States Patent [19]

Asano et al.

[11] Patent Number: 4,622,385

[45] Date of Patent: Nov. 11, 1986

[54] METHOD OF PRODUCING POLYACETAL POLYMER SHOWING IMPROVED HEAT RESISTANCE AND MOLDABILITY

[75] Inventors: Takeshi Asano; Tsuneyoshi Okada; Hiroshi Nakatsuji, all of Fuji, Japan

[73] Assignee: Polyplastics Company, Ltd., Osaka, Japan

[21] Appl. No.: 649,450

[22] Filed: Sep. 11, 1984

[30] Foreign Application Priority Data

Sep. 16, 1983 [JP] Japan ................. 58-170989

[51] Int. Cl.$^4$ ................................ C08G 2/28
[52] U.S. Cl. ...................... 528/491; 528/480; 528/488; 528/493; 528/494; 528/495; 528/499; 528/503
[58] Field of Search ............ 528/488, 491, 493, 494, 528/495, 499, 503, 480

[56] References Cited

U.S. PATENT DOCUMENTS

| | | | |
|---|---|---|---|
| 3,275,593 | 9/1966 | Querfurth | 528/492 |
| 3,371,066 | 2/1968 | Grundmann et al. | 528/491 |
| 4,151,346 | 4/1979 | Sextro et al. | 528/495 X |
| 4,158,091 | 6/1979 | Radici et al. | 528/488 X |
| 4,458,064 | 7/1984 | Chatterjee | 528/499 X |

*Primary Examiner*—Lucille M. Phynes
*Attorney, Agent, or Firm*—Burns, Doane, Swecker & Mathis

[57] ABSTRACT

After crude polyacetal polymers mainly comprising bonded oxymethylene groups in the main chain thereof were once molten, they are heated at temperatures of 80° C. or above in liquid mediums, in which said crude polyacetal polymers are insoluble, with keeping a heterogeneous system after they were once molten.

13 Claims, No Drawings

METHOD OF PRODUCING POLYACETAL POLYMER SHOWING IMPROVED HEAT RESISTANCE AND MOLDABILITY

The present invention relates to an improved after-treatment method of polyacetal polymers to obtain thermally stable and superior in moldability and other properties.

Polyacetal resins are being used as engineering plastics in various fields in the form of molded product owing to superior properties thereof. These polyacetal resins are classified roughly into homopolymers and copolymers. The former is obtained by polymerization of formaldehyde, trioxane or the like in the presence of catalyzers, and stabilized by blocking the ends of polymers, which were with chemically stable groups by esterification, etherification, urethanization and the like. However, when the parts, which did not take part in such a reaction, partially remain, the products show some disadvantages in quality, processability and the like thereof. On the other hand, copolymers of cyclic acetals such as trioxane as the main material and cyclic ethers or formals such as ethylene oxide copolymerized in the presence of catalyzers are well known. Also a method, in which comonomers other than an oxymethylene group are introduced into homopolymers once formed, is proposed. However, such copolymers have generally unstable parts at the ends of molecule, whereby they are incapable of being practically used. Accordingly, it is required to remove such unstable parts. That is the existence of such unstable parts leads to problems in quality and processability for both homopolymers and copolymers. For example, in the case where it is desired to continuously produce a large number of molded products for a long time, the deposit gradually adheres to the surface of a metal mold, thereby damaging mold releasing property, outward flatness, dimensional accuracy and the like of molded products. As a result, the molding process must be stopped to clean after a short time. Although various kinds of art have been proposed to remove such unstable parts, the sufficient result has never been obtained. Such a problem of moldability, in particular of deposits on a metal mold mainly comes from unstable parts contained in polyacetal resins. However, the inventors found that not only such unstable parts but also catalyzers remaining in polymers and chemically stable low molecular polyacetal oligomers lead to the adherence of deposits to a metal mold, thereby damaging mold releasing property and moldability such as an outward appearance, dimensional accuracy and the like of molded products. The novel treating method of effectively removing the above described substances, which are main causes of the above described wrong moldability, such as unstable parts, low molecular oligomers, catalyzers and the like contained in polyacetal polymers was established from the inventors' studies of improvement of polymers in quality such as thermal stability and moldability on the basis of the above described information. Thus a method of producing polyacetals having superior quality and moldability, which have never been attained, was established.

That is to say, the present invention relates to an after-treating method of polyacetal polymers, characterized by that crude polyacetal polymers or copolymers mainly comprising bonded oxymethylene groups in the main chain of a molecule thereof and containing unstable parts therein are initially melted, then heated at temperatures of 80° C. or above in liquid mediums, in which said crude polyacetal polymers or copolymers are insoluble, while keeping a heterogeneous condition.

A method of removing unstable parts by heating crude polyacetals, which were directly obtained by copolymerization reactions, in insoluble mediums, while keeping a heterogeneous system without preliminarily melting is known (for example Japanese Patent Publication No. 10435/1965; Japanese Patent Publication No. 7553/1968). Although, according to this method, the effect of removing unstable ends can be reached to some extent, it is not sufficient. On the other hand, although also a method of decomposing and removing unstable parts by heating copolymers to disolve and treating in a homogeneous liquid condition is proposed (Japanese Patent Publication No. 18714/1968), such a treatment in a homogeneous liquid is disadvantageous not only in handling since fibrous substances are formed in the precipitation process of polymers or remarkably fine powdery precipitation are formed and adhered to apparatus but also in economy since a large amount of organic solvent is required. On the contrary to these conventional methods, according to a method of the present invention, a remarkably economical effect, which has never been reached, can be attained by adopting a novel means in which crude polymers are first melted in an extruder and the like and then heated in liquid mediums, in which said crude polymers are insoluble, while keeping a heterogeneous system.

A method according to the present invention will be described below in detail.

At first, although every polyacetal polymer, which is obtained by polymerizing according to the known methods, can be effectively used as crude polyacetal polymers in a method of the present invention, a method of the present invention is particularly effective for copolymers. These copolymers are obtained by copolymerizing cyclic acetals such as trioxane as the main monomer and known comonomers copolymerizable with said cyclic acetals in the presence of known catalyzers. For example, one of them is a copolymer having the melting point of 150° C. or above and containing two or more bonded carbon atoms in the main chain thereof which is obtained by copolymerizing trioxane as the main monomer and monomers containing cyclic ethers or cyclic formals such as ethylene oxide, dioxolane and 1,4-butanediolformal of 0.2 to 10% by weight in the presence of catalyzers such as boron trifluoride and complex compounds thereof. In addition, the third monomers, for example multi-component copolymers, which are obtained by copolymerizing multi-component monomers containing mono- or diglycidyl compounds, and copolymers having a branched or cross-linked structure in a molecule, are included in said comonomers. Further, a method of the present invention can be applied to copolymer obtained by introducing comonomers into homopolymers once formed. In the application of a method of the present invention to crude copolymers obtained by these polymerization reactions, it is desired that the melting process be carried out after a part or all of non-reacted monomers is separated and removed by washing containing inhibitors and drying or inhibiting catalyzers and then heating in suitable gaseous streams. It is, however, possible to melt polymerization products containing a small amount of residual monomers after inhibiting catalyzers and simultaneously evaporating and separating said residual monomers, too.

Although a method of the present invention is particularly effective for crude copolymers as described above, it is also effective for homopolymers, which were stabilized by chemically blocking their ends, in the improvement of thermal stability and moldability by decomposing and separating a small amount of unstable polymers, which did not take part in this end-blocking reaction, and removing low molecular oligomers and the like contained in polymers. In cases where a method of the present invention is applied to homopolymers, although it is desired that homopolymers have a hydrolysis resistant end structure in which the ends are blocked by such processes as etherification and urethanization, a method of the present invention can be also applied to crude polymers, of which ends were subjected to an esterization process, by suitably selecting the treating condition of the present invention.

The melting process, which is an essential condition of the present invention, can be carried out by heating crude polyacetal polymers at temperatures of the melting point thereof and above in an extruder and the like and then extruding in the usual manner.

Although the addition of stabilizers and the like is not always necessary in this melting process, the addition of known stabilizers or decomposition-accelerators for unstable parts results an advantageous effect. Antioxidants such as known sterically hindered phenols are preferably used as stabilizers of polyacetals. That is to say, at least one compound selected from the group consisting of 2,2'-methylenebis(4-methyl-6-t-butylphenol), hexamethyleneglycol-bis(3,5-di-t-butyl-4-hydroxyhydrocinnamate), tetrakis[methylene(3,5-di-t-butyl-4-hydroxyhydrocinnamate)]methane, triethyleneglycol-bis-3-(3-t-butyl-4-hydroxy-5-methylphenyl)propionate, 1,3,5-trimethyl-2,4,6-tris(3,5-di-t-butyl-4-hydroxybenzyl)benzene, n-octadecyl-3-(4'-hydroxy-3',5'-di-t-butylphenol)propionate, 4,4'-methylenebis(2,6-di-t-butylphenol), 4,4'-butylidene-bis-(6-t-butyl-3-methyl-henol), 2,2'-thiodiethyl-bis-[3-(3,5-di-t-butyl-4-hydroxyphenyl)propionate, di-stearyl-3,5-di-t-butyl-4-hydroxybenzylphosphonate and 2-t-butyl-6-(3-t-butyl-5-methyl-2-hydroxybenzyl)-4-methylphenylacrylate can be used. Of these compounds hexamethyleneglycol-bis(3,5-t-butyl-4-hydroxyhydrocinnamate), tetrakis[methylene(3,5-di-t-butyl-4-hydroxyhydrocinnamate)] and triethyleneglycol-bis-3-(3-t-butyl-4-hydroxy-5-methylphenyl)propionate are in particular preferably used. At least one of these compounds can be added at a ratio of 0 to 2% by weight based on crude polymers. Organic or inorganic alkaline substances and nitrogen-containing high molecular compounds are used as other stabilizers or decomposition-accelerators for unstable parts. Such kinds of stabilizer or additive include hydroxides of ammonium or alkaline metals or alkaline earth metals; their inorganic salts; their salts of organic acids such as carboxylic acids; their alkoxides; various kinds of amine compounds such as alkylamines or alkoxylamines; amidine compounds such as dicyandiamide or melamine or derivatives thereof; amide compounds such as alkylamides and polyamides; other nitrogen-containing organic high molecular compounds such as polyvinylpyrollidone and the like. It is suitable that also this kind of stabilizer or additive is added at a ratio of 0 to 2% by weight based on crude polymers. This kind of stabilizer or additive may be used together with the above described sterically hindered phenols. The mixtures of this kind of stabilizer or additive may be singly used. These stabilizers are added at the suitable steps prior to the melting process of crude polymers or during said melting process to effectively suppress undesirable decomposition reactions such as the degradation of the main chain of polymers and selectively accelerate the decomposition of unstable parts.

The melting process in the present invention may be carried out in the presence of a small amount less than 10% based on polymers of water or organic solvent or their mixture. The addition of a small amount of water and the like is not only effective for the decomposition and separation of unstable parts in the melting process of crude polymers and the reduction of the content of unstable parts in this stage but also useful to make porous pellets the extraction of which is easily carried out at next liquid treatment.

Every apparatus, which has been known, may be used as a melting apparatus used in the heating melting process in the present invention. For example, various kinds of uniaxial extruders with a vent hole, biaxial extruders with a vent hole and other continuous mixing-heating deaeration apparatus suitable for highly viscous substanced are used. It is important for these apparatus to have a vent hole or an exhaust port and it is desirable that the inside of apparatus be made vacuous through said vent hole or exhaust port to accelerate the exhaust of gases produced by the decomposition of polymers or preliminarily added water and the like. Furthermore, the sufficient agitation, the renewal of surfaces, the expansion of effective aeration area and the like are the desirable conditions for increasing the removing effect of unstable parts in this stage.

It is necessary to keep the resin temperature at least at the polymer melting point or above. It is suitable that they are within a range from the melting point of polymers to higher by 100° C. than melting point. The treating time of about 1 to 30 min. is sufficient. Although the removal of unstable parts in crude polymers can be reached to some extent by the above described heating and melting process, it is insufficient yet and in particular the removal of oligomers and residual catalyzers can hardly be expected only by said heating and melting process. These bad substances can be completely removed by the combination of said heating and melting process with the treatment of a heterogeneous system in mediums, in which said crude polymers are insoluble, and the combination and the order of the process steps are most important and essential to the invention. The above described melting process acts as the preliminary treatment for the next heterogeneous system treatment, the crystalline structure of polymers, being transformed into easily extractable and removable forms by melting before the treatment of liquid medium. It is another advantage of the melting and pelletizing process that the subsequent treatment in liquid mediums can be made remarkably easy to handle and the effect can be uniformly obtained by turning the crude polymer to solid particles of uniform size. Such an advantage can not be reached for polymerization bulks having a wide particle size distribution obtained directly by polymerization reactions or their mechanically crushed substances.

According to a method of the present invention, crude polymers are first melted and then treated in liquid mediums, in which they are insoluble, at temperatures of 80° C. or above while keeping a heterogeneous system. In this case, it is an essential condition that said mediums keep their liquid state. Consequently, the pressure in this treatment is dependent upon the kind of liquid mediums and treating temperatures. On the other hand, said crude polymers may be used in the molten state in the treatment in liquid mediums. The heterogeneous system with two-phases can be used in the treatment according to the present invention, and it is possible by means of the suitable apparatus and operations even though it is a liquid (polymers)-liquid (mediums) system. It is, however, preferable in respect to handling and apparatus that crude polymers are solidified to granular substances after melting step, and then the resulting granular substances are subjected to the heating treatment in heterogeneous system which is a solid (polymers)-liquid (mediums) system at the lower temperatures than melting point of said crude polymers preferably within a temperature range of 80° C. to the melting point of said crude polymers. The lower temperatures than 80° C. are undesirable since the speed of decomposing and removing unstable parts is small at those temperatures, whereby it takes a remarkably long time. The temperature range of 100° C. to 150° C. is particularly preferable.

Every substance, which hardly dissolves crude polymers at the treating temperature, can be used as said liquid mediums. Water or various kinds of alcohols, ethers and ketones or their mixtures can be used. Of these substances, the most suitable mediums are water or aqueous solutions containing water as the main ingredient. It is necessary for these mediums to be nearly neutral or alkaline and have pH of higher than 6. Although the desirable values of pH are dependent upon the kind of polymers (end structures of polymer) and stabilizers and other additives added to polymers in the melting process, it is generally desirable for accelerating the decomposition of unstable parts that the pH be within a range of 8 to 11, that is to say weakly alkaline. It is, however, naturally desirable that mediums are kept in a nearly neutral state in cases where said polymers are homopolymers, of which ends are ester form, thereby having little resistance against alkalis. In addition, it is desirable in cases of copolymers without adding any stabilizers thereto that medium having comparatively high pHs be used. On the other hand, it is not necessary to add alkaline substances to mediums in cases where stabilizers added to polymers are alkaline substances. It is also possible that the suitable values of pH are naturally kept by the dissolution of stabilizers in mediums. Furthermore, it is naturally desirable that mediums are nearly neutral in cases where stabilizers added to polymers tend to discolor by the action of alkalis, and the coloring of the products is important. In general, the suitable alkaline substances or buffer solutions are suitably added to the treating mediums prior to the treatment or during the treatment in order to keep the suitable values of pH of the treating mediums. Hydroxides of ammonia or alkaline metals or alkaline earth metals, their salts with inorganic or organic weak acids, amines, amidines and amides are used as said alkaline substances. Said alkaline substances include hydroxides, carbonates, phosphates and carboxylates of ammonium, sodium, potassium, calcium and magnesium or mono-, di- and tri-alkylamines or mono, di- and tri-alkoxylamines or cyanoguanidine and melamine or their derivatives.

According to a method of the present invention, the treatment in liquid mediums, in which crude polymers are insoluble, can be carried out by immersing crude polymers in said mediums at the appointed temperatures for the appointed times in the batch manner, continuous manner and the like. In this case, it is generally desirable that the suitable stirring be carried out. The batch type or parallel flow continuous type method and the method, in which polymers and mediums flow countercurrentwise to each other, may be used as a method for bringing polymers into contact with mediums. In particular, such a method, in which polymers are brought into contact with mediums in a countercurrent manner, is not only still more effective for the removal of bad substances such as unstable parts and oligomers with a small amount of medium but also advantageous for the prevention of the change of color of polymers. Further, as described above, as to the practice of this treatment, pellet-like polymers uniform in particle size obtained by preliminarily melting and extruding according to the present invention have the secondary advantage that the treatment thereof by a method of counter-current continuous type can be very easily carried out in comparison with the case where crude polymers non-uniform in particle size are directly used.

According to the present invention, it is necessary for liquid mediums to be used at such a ratio that at least polymers can be sufficiently immersed in them. In respect of the effect and economy, liquid medium are used at a ratio of 1 to 20 times, preferably 3 to 15 times by weight to polymer. Furthermore, this treatment may be carried out in two or more steps. Although the time required for treating polymers in liquid mediums is dependent upon the quantity of unstable parts in polymers subjected to the melting process, the content of oligomers in polymers and the like, in general is 0.2 to 10 hours, preferably 0.5 to 5 hours. The time required for treating polymers in liquid mediums is reduced with an increase of treating temperature and a reduction of the quantity of unstable parts.

It was confirmed from the investigation of substances contained in liquid mediums after the above described treatment that not only formaldehyde produced by the decomposition and dissolution of unstable parts but also chemically stable but remarkably low molecular polyacetal oligomers were contained. It was also confirmed that polymers subjected to the sufficient treatment according to a method of the present invention no longer showed the dissolution of oligomers after the repetition of the same treatments and also the quantity of the substances connected with polymerization catalyzers such as boron trifluoride in polymers was remarkably reduced after the treatment. Consequently, it was confirmed from the above described that dry polymers treated according to a method of the present invention were remarkably improved in thermal stability, moldability and the like and as a result polyacetal resins remarkably superior in these properties could be produced by a method of the present invention.

The attainment of such superior effects by the use of a method of the present invention is on account of the synergistic effect owing to the combination of the preliminary melting process of crude polymers obtained by polymerization reactions and next heating treatment of said crude polymers in liquid mediums in which said crude polymers are insoluble. That is to say, it can be understood that if crude polymers are preliminarily melted, treating mediums can be more effectively penetrated into polymer and diffused therein in comparison with cases where polymers are heated directly in liquid mediums without being subjected to the preliminary melting process since the crystalline minute structure of polymers are changed. This is remarkably effective for not only the decomposition and removal of unstable parts but also the extraction and removal of the substances, which are bad for thermal stability, moldability and other properties, such as low molecular acetal oligomers and residual catalyzers. It is as described above that the heating and melting process itself is effective for the removal of unstable parts and a part of unstable parts can be removed in this heating and melting stage. In addition, the remarkable effect, which is attained by a method of the present invention, can not be reached by carrying out the processes in the present invention in a reverse order, that is to say treating polymerization products directly in liquid mediums and then melting them in an extruder and the like. As for this, Examples and Comparative Examples should be referred.

In addition, in the melting process in an extruder in a method of the present invention, all additives required for the final products, for example various kinds of stabilizer, lubricant, coloring agent, inorganic fillers such as glass, high molecular or low molecular organic materials and the like may be added to polymers and the resulting blend may be pelletized and then the resulting pellets may be treated in liquid mediums and dried to obtain the final products. It goes without saying that the final compositions can be obtained by adding or supplementing additives again after the completion of a method of the present invention without adding all additives required for the final products in the melting process.

Although the preferred examples of the present invention are shown below, it goes without saying that the present invention is not limited to them. Technical terms and measuring methods used in Examples and Comparative Examples are as follows so far as they are not mentioned specially:

Unstable ends in polymers and unstable polymers (hereinafter called "unstable parts" for short)

Polymers of 1 g are added to 100 ml of 50% aqueous solution of methanol containing ammonium hydroxide at a ratio of 0.5%. The resulting mixture is heated in a closed vessel at 180° C. for 45 min. to dissolve polymers and then the quantity of formaldehyde, which was decomposed and dissolved in the solution, is quantitatively analysed. The quantity of formaldehyde is indicated in % by weight based on polymers.

Reduction rate of weight by heating:

Polymers of 5 g are dried in vacuum and then heated in air at 230° C. for 45 min. The reduction rate of weight is calculated.

Content of low molecular polyacetal oligomers (hereinafter called "oligomers" for short)

250 ml of water containing ammonium hydroxide at a ratio of 0.5% is added to polymers of 10 g put in an autoclave. The mixture is treated at 150° C. for 3 hours and then cooled to 100° C.~80° C., and solid substances are separated. Then the solution is still further cooled to room temperature and then made to stand still for 24 hours. The quantity of suspended solid substances, which were deposited in this period, is indicated in % by weight as "oligomer". It was confirmed from the results of quantitative analysis that these suspended solid substances are comparatively low molecular polyacetal oligomers which are resistant against alkalis.

Residual polymerization catalyzers of boron trifluoride type (hereinafter called "residual catalyzers" for short)

Polymers obtained by the use of polymerization catalyzers of boron trifluoride type are tested on the content of an elementary fluorine by the microanalysis. The quantity of boron trifluoride, which was converted from the content of an elementary fluorine, is indicated in ppm by weight based on polymers.

Moldability:

Polymers are continuously molded by means of a molding machine under the appointed conditions. After the repeated moldings of the appointed number of times the quantity of deposits on the surface of a metal mold and mold releasing resistance are measured. Moldability is evaluated from the quantity of deposits on the surface of a metal mold and mold releasing resistance in 10 ranks as follows:

| 1 | 2 | 3 | 4 | 5 | 6 | 7 | 8 | 9 | 10 |
|---|---|---|---|---|---|---|---|---|---|
| Deposits | | little | | | Deposits | | | | much |
| Mold releasing resistance | | little | | | Mold releasing resistance | | | | large |
| (Good) ←— | | | | | | | | —→(Bad) | |

EXAMPLE 1

(a) Molten trioxane containing dioxolane at a ratio of 4.0% by weight and ethyletherate of boron trifluoride (40 ppm) are continuously fed in a continuous polymerization reactor having a biaxial mixing-transferring mechanism provided with a large number of paddles. Water of 80° C. is passed through the outside jacket of the reactor. The reaction products discharged from another end of the reactor are smashed to pieces to 2.0 mm or less in particle size in a crasher. The resulting particles of reaction products are washed with 0.1%-aqueous solution of ammonium hydroxide at 80° C., dehydrated and dried to obtain polyacetal copolymers. The resulting crude polymers show the following properties:

| | |
|---|---|
| Unstable parts | 2.3% |
| Reduction rate of weight by thermal decomposition (Note) | 2.4% |
| Oligomers (Note) | 0.31% |
| Residual catalyzers | 37 ppm |

(Note)
Measured after 2,2'-methylenebis(4-methyl-6-t-butylphenol) of 0.5% and dicyandiamide of 0.2% were added as stabilizers and the mixture was sufficiently mixed.

(b) Crude polymers fed in a uniaxial extruder provided with a vent hole are molten and extruded with at the resin temperature of 210° C., and the pressure of 300 mmHg may be kept at a vent hole and adding 5%-aqueous solution of tributylamine at a ratio of 3 parts by weight based on crude polymers of 100 parts by weight. Thus pellets having particle size of 2 to 3 mm are prepared.

(c) Then these pellets of 100 parts by weight are mixed with 1,000 parts by weight of an aqueous solution containing methanol of 15%, of which pH of 10 is kept by the use of liquid ammonia, with stirring. The mixture is treated at 100° C. for 4 hours and then washed and dried.

The properties of the resulting polymers are shown in Table 1.

COMPARATIVE EXAMPLE 1

The same crude polymers as in Example 1-a) are treated directly in liquid mediums, in which said crude polymers are insoluble, under the same conditions as in Example 1-c) without preliminarily melting and extruding and then molten and extruded under the same conditions as in Example 1-b). That is to say, the case where the melting and extruding process in Example 1 is omitted and the case where the melting and extruding process and the treatment in liquid mediums, in which said crude polymers are insoluble, are carried out in a reverse order to that in Example 1 are shown in the Comparative Example. The properties of the resulting polymers are also shown in Table 1 for comparison.

It is obvious from the results shown in Table 1 that not only polymers obtained according to a method of the present invention, in which polymers are preliminarily molten and extruded and then treated in liquid mediums in which said polymers are insoluble, are remarkably superior to polymers obtained by a method, in which polymers are treated in liquid mediums, in which said polymers are insoluble, without preliminarily melting and extruding, in properties but also they are superior to polymers obtained by a method in which the treatment in liquid mediums, in which said polymers are insoluble, and the melting and extruding process are carried out in a reverse order to that in a method of the present invention, in properties.

TABLE 1

|  | Example 1 | Comparative Example 1 (Note-1) |  |
|---|---|---|---|
| Unstable parts (%) | 0.4 | (1.2) | 1.0 |
| Reduction rate of weight by heating (%) (Note-2) | 0.53 | (1.33) | 1.12 |
| Oligomers (%) (Note-2) | 0.05 | (0.10) | 0.09 |
| Residual catalyzers (ppm) | 12 | (21) | 18 |
| Moldability (Note-2) | 3 | (8) | 5 |

Note-1: Numerical values in parentheses show the case where the melting and extruding process is omitted.
Note-2: Measured after 2,2'-methylenebis(4-methyl-6-t-butylphenol) of 0.5% and dicyandiamide of 0.1% were added as stabilizers and the mixture was sufficiently mixed.

EXAMPLE 2

(a) Crude polymers are prepared in the same manner as in Example 1-a).

(b) 2,2'-methylenebis(4-methyl-6-t-butylphenol) of 0.5 parts by weight and melamine of 0.5 parts by weight are added to said crude polymers of 100 parts by weight. The resulting mixture is fed in the same extruder as in Example 1 and molten and extruded at resin temperature of 200° C. with sucking so that the pressure of 300 mmHg may be kept at a vent hole. Thus pellets having particle size of 2 to 3 mm are prepared.

(c) Then these pellets of 100 parts by weight are mixed with water of 1,200 parts by weight. The mixture is treated in an auto clave at 130° C. for 3 hours with stirring and then slightly washed and dried.

The properties of the resulting polymers are shown in Table 2.

COMPARATIVE EXAMPLE 2

100 parts by weight of the same crude polymers as in Example 2-a) are treated directly in hot water under the same condition as in Example 2-c) without preliminarily melting and extruding and then molten and extruded under the same conditions as in Example 2-b). That is to say, the case where the melting and extruding process in Example 2 is omitted and the case where the melting and extruding process and the treatment in liquid mediums, in which said crude polymers are insoluble, are carried out in a reverse order to that in Example 2 are shown in this Comparative Example.

The results are also shown in Table 2.

TABLE 2

|  | Example 2 | Comparative Example 2 (Note-1) |  |
|---|---|---|---|
| Unstable parts (%) | 0.3 | (2.1) | 1.8 |
| Reduction rate of weight by heating (%) | 0.45 | (—) | 1.81 |
| Oligomers (%) | 0.04 | (—) | 0.10 |
| Residual catalyzers (ppm) | 9 | (18) | 15 |
| Moldability | 2 | (—) | 7 |

Note-1: Numerical values in parentheses show the case where the melting and extruding process is omitted.

EXAMPLE 3

(a) Crude polymers are prepared in the same manner as in Example 1-a).

(b) Crude polymers of 100 parts by weight, tetrakis [methylene(3,5-di-t-butyl-4-hydroxyhydrocinnamate)]methane (Ilganox 1010 manufactured by Ciba Geigy, Ltd.) of 0.1 parts by weight and 1.5 parts by weight of 7%-aqueous solution of diethylamine are fed in a biaxial extruder provided with a vent hole and molten and extruded at resin temperature of 210° C. with keeping the pressure of 200 mmHg at a vent hole to prepare pellets.

(c) Then these pellets of 100 parts by weight are mixed with 1,000 parts by weight of water, of which pH of 9.2 is kept by adding diethylamine, treated at 140° C. for 1 hour with stirring and dried. The properties of the resulting polymers are shown in Table 3.

COMPARATIVE EXAMPLE 3

Crude polymers perpared in the same manner as in Example 3-a) are treated directly in hot water under the same conditions as in Example 3-c) without preliminarily melting and extruding. Then the resulting polymers are molten and extruded under the same conditions as in Example 3-b). That is to say, the case where the melting and extruding process in Example 3 is omitted and the case where the melting and extruding process and the treatment in hot water are carried out in reverse order to that in Example 3 are shown in this Comparative Example.

The properties of the resulting polymers are shown in Table 3.

TABLE 3

|  | Example 3 | Comparative Example 3 (Note-1) |  |
|---|---|---|---|
| Unstable parts (%) | 0.3 | (1.0) | 0.7 |
| Reduction rate of weight by heating | 0.43 | (1.08) | 0.81 |

TABLE 3-continued

| | Example 3 | Comparative Example 3 (Note-1) | |
|---|---|---|---|
| (%) (Note-2) | | | |
| Oligomers (%) (Note-2) | 0.04 | (0.09) | 0.08 |
| Residual catalyzers (ppm) | 9 | (16) | 15 |
| Moldability (Note-2) | 2 | ( 7 ) | 5 |

Note-1: Numerical values in parentheses show the case where the melting and extruding process is omitted.
Note-2: Measured after 2,2'-methylenebis(4-methyl-6-t-butylphenol) of 0.5% and dicyandiamide of 0.1% were added as stabilizers and the mixture was sufficiently mixed.

EXAMPLE 4

(a) Molten trioxane containing ethylene oxide at a ratio of 2.5% and boron trifluoride of 80 ppm are continuously fed in a continuous polymerization reactor having a fed in a continuous polymerization reactor having a uniaxial mixing-transferring mechanism. Warm water of 70° C. is pass through the outside jacket of the reactor.

The reaction products discharged from another end of the reactor are crashed to pieces in a crasher with adding a small amount of aqueous solution of tributylamine. The resulting particles of reaction products are washed with hot water of 100 ° C. and then dehydrated and dried. The resulting crude polymers show the following properties:

| Unstable parts | 3.7% |
|---|---|
| Reduction rate of weight by thermal decomposition (Note) | 4.1% |
| Oligomers (Note) | 0.47% |
| Residual catalyzers | 68 ppm |

(Note: Measured after 2,2'-methylenebis(4-methyl-6-t-butylphenol) of 0.5% and dicyandiamide of 0.2% were added and the mixture was sufficiently mixed).

(b) Triethyleneglycol-bis-3-(3-t-butyl-4-hydroxy-5-methylphenyl)propionate (Irganox 245 manufactured by Ciba Geigy, Ltd.) of 0.5 parts by weight, calcium stearate of 0.1 parts by weight and water of 1 part by weight are added to crude polymers of 100 parts by weight and then the resulting compound is molten and extruded by means of a biaxial extruder provided with a vent hole to resin temperature of 190° C. with keeping the pressure of 50 mmHg at a vent hole. Thus pellets are prepared.

(c) Then said pellets are fed in an insulated vertical and cylindrical pressure vessel provided with a gently rotating stirring axis therein continuously at a ratio of 100 parts by weight per hour through the upper portion thereof and simultaneously water, of which pH of 9.0 is kept by the use of secondary sodium phosphate, of 140° C. is continuously fed in said pressure vessel at a ratio of 1,000 parts by weight per hour through the upper portion thereof alike with discharging polymers continuously through the bottom portion of said pressure vessel at a ratio of 100 parts by weight per hour and simultaneously discharging the treating solution continuously through said bottom portion of said pressure vessel alike at a ratio of 1,000 parts by weight per hour (temperature of said treating solution being discharged is 135° C.). In this treatment, pellets and the treating solution are kept at the appointed level in said pressure vessel and the average stay is about 2 hours. The discharged pellets are separated from the solution and dried.

The properties of the resulting pellets are shown in Table 4.

COMPARATIVE EXAMPLE 4

The same crude polymers as those used in Example 4-a) are treated directly in hot water under the same conditions as in Example 4-c) without preliminarily melting and extruding. Then the resulting polymers are molten under the same conditions as in Example 4-b). That is to say, the case where the melting and extruding process in Example 4 is omitted and the case where the melting and extruding process and the treatment in liquid mediums, in which said crude polymers are insoluble, are carried out in a reverse order to that in Example 4 are shown in this Comparative Example.

The properties of the resulting polymers are also shown in Table 4.

TABLE 4

| | Example 4 | Comparative Example 4 (Note-1) | |
|---|---|---|---|
| Unstable parts (%) | 0.5 | (1.4) | 1.2 |
| Reduction rate of weight by heating (%) | 0.52 | (—) | 1.09 |
| Oligomers (%) | 0.05 | (—) | 0.14 |
| Residual catalyzers (ppm) | 17 | (31) | 28 |
| Moldability | 2 | (—) | 4 |

(Note-1): Numerical values in parentheses show the case where the melting and extruding process is omitted.

EXAMPLE 5

(a) The same crude polymers as those prepared in Example 4-a) are used.

(b) Hexamethyleneglycol-bis(3,5-di-t-butyl-4-hydroxyhydrocinnamate) (Irganox 259 manufactured by Ciba-Geigy, Ltd.) of 0.5 parts by weight and polyamide (Diamide manufactured by DAICEL Chemical Co., Ltd.) of 0.5 parts by weight are added to crude polymers of 100 parts by weight and then the resulting compound is molten and extruded with a biaxial extruder provided with a vent hole at resin temperature of 200° C. with keeping the pressure of 200 mmHg at a vent hole. Thus pellets are prepared.

(c) Then water, of which pH of 9.8 is kept by the use of triethanolamine, of 140° C. is fed from bottom in an insulated vertical and cylindrical pressure vessel provided with a gently rotating stirring axis therein, in which said pellets were put, the treating solution is discharged from the upper portion of said pressure vessel (temperature of the treating solution being extracted is 135° C.). That is to say, the treatment is carried out so that pellets may be always immersed in the treating solution and the treating solution may flow upwardly among the pellets. The treatment is stopped after 2 hours and then the pellets are dried. The treating solution is used at a ratio of 700 parts by weight based on the polymers of 100 parts by weight in this treatment.

The properties of the resulting polymers are shown in Table 5.

COMPARATIVE EXAMPLE 5

The same crude polymers as those prepared in Example 5-a) are treated directly in liquid mediums, in which said crude polymers are insoluble, under the same conditions as in Example 5-c) without preliminarily melting and extruding and then molten and extruded under the same conditions as in Example 5-b). That is to say, the case where the melting and extruding process in Example 5 is omitted and the case where the melting and extruding process and the treatment in liquid mediums are carried in a reverse order to that in Example 5 are shown in this Comparative Example.

The properties of the resulting polymers are also shown in Table 5.

TABLE 5

|  | Example 5 | Comparative Example 5 (Note-1) |  |
|---|---|---|---|
| Unstable parts (%) | 0.3 | (0.9) | 0.7 |
| Reduction rate of weight by heating (%) | 0.39 | (—) | 0.85 |
| Oligomers (%) | 0.03 | (—) | 0.11 |
| Residual catalyzers (ppm) | 12 | (28) | 24 |
| Moldability | 1 | (—) | 3 |

Note-1: Numerical values in parentheses show the case where the melting and extruding process is omitted.

EXAMPLE 6

(a) The same crude polymers as those prepared in Example 4-a) are used.

(b) These crude polymers are molten and extruded in a biaxial extruder provided with a vent hole at resin temperature of 220° C. with keeping the pressure of 300 mmHg at a vent hole and adding 5%-aqueous solution of triethanolamine at a ratio of 2.5 parts by weight based on 100 parts by weight of said crude polymers. Thus pellets are prepared.

(c) Then said pellets are continuously fed in an insulated vertical and cylindrical pressure vessel provided with suitable guide plates therein from the upper portion of said pressure vessel at a ratio of 100 parts by weight per hour and simultaneously water, of which pH of 9.5 is kept by the use of triethanolamine, of 140° C. is fed in said pressure vessel from the lower portion of said pressure vessel at a ratio of 600 parts by weight per hour with continuously taking out the pellets and a part of the treating solution from the lower portion of said pressure vessel under the conditions that the appointed amount of the pellets is always immersed in the treating solution in said pressure vessel, the pellets and the treating solution being continuously transferred countercurrentwise, and the average stay of the pellets being 2 hours. The properties of the pellets after the treatment are shown in Table 6.

COMPARATIVE EXAMPLE 6

The same crude polymers as those prepared in Example 6-a) are treated directly in liquid mediums in the same apparatus and under the same conditions as in Example 6-c) without preliminarily melting and extruding. Then the treated polymers are molten and extruded under the same conditions as in Example 6-b) to be pelletized. That is to say, the case where the melting and extruding process in Example 6 is omitted and the case where the melting and extruding process and the treatment in liquid mediums are carried out in a reverse order to that in Example 6 are shown in this Comparative Example.

The properties of the resulting polymers are also shown in Table 6.

TABLE 6

|  | Example 6 | Comparative Example 6 (Note-1) |  |
|---|---|---|---|
| Unstable parts (%) | 0.2 | (0.8) | 0.5 |
| Reduction rate of weight by heating (%) (Note-2) | 0.37 | (0.81) | 0.61 |
| Oligomers (%) (Note-2) | 0.03 | (0.11) | 0.09 |
| Residual catalyzers (ppm) | 13 | (26) | 25 |
| Moldability (Note-2) | 1 | (4) | 2 |

Note-1: Numerical values in parentheses show the case where the melting and extruding process is omitted.
Note-2: Measured after 2,2'-methylenebis(4-methyl-6-t-butylphenol) of 0.5% and dicyandiamide of 0.1% were added as stabilizers and the mixture was sufficiently mixed.

EXAMPLE 7 AND COMPARATIVE EXAMPLE 7

The treatment is carried out in the same manner as in Example 6 and Comparative Example 6 excepting that tetrakis[methylene(3,5-di-t-butyl-4-hydroxyhydrocinnamate)]methane (Irganox 1010 manufactured by Ciba-Geigy, Ltd.) of 0.5 parts by weight and calcium hydroxysterate of 0.1 parts by weight are added to 100 parts by weight of polymers in the melting and extruding process.

The properties of the resulting pellets are shown in Table 7.

TABLE 7

|  | Example 7 | Comparative Example 7 (Note-1) |  |
|---|---|---|---|
| Unstable parts (%) | 0.2 | (0.8) | 0.5 |
| Reduction rate of weight by heating (%) | 0.35 | (—) | 0.57 |
| Oligomers (%) | 0.03 | (—) | 0.08 |
| Residual catalyzers (ppm) | 12 | (26) | 26 |
| Moldability | 1 | (—) | 2 |

Note-1: Numerical values in parentheses show the case where the melting and extruding process is omitted.

What is claimed is:

1. A method of treating a polyacetal polymer comprising the steps of:
   melting crude polyacetal polymer having a main chain containing bonded oxymethylene groups; and
   heating 100 parts by weight of said polyacetal polymer to a temperature of at least 80° C. in at least 100 parts by weight of a liquid medium into which said polyacetal polymer is insoluble and maintaining said polyacetal polymer and liquid medium a a heterogeneous system.

2. A method as set forth in claim 1, in which said crude polyacetal polymers are copolymers containing oxyalkylene groups having two or more adjacent carbon atoms therein the main chain thereof.

3. A method as set forth in claim 1, in which said melting step comprises adding at least one kind of stabilizer and alkaline substance.

4. A method as set forth in claim 1, in which said melting step is carried out in the presence of less than 10% by weight of water based on said crude polymer.

5. A method as set forth in claim 1, in which said liquid medium mainly comprises water.

6. A method as set forth in claim 1, in which said liquid medium has a pH of at least 6.

7. A method as set forth in claim 1, in which said heating step is carried out by the counterflow contact of said medium with said polymer.

8. A method as set forth in claim 1 further comprising the step of solidifying said crude polyacetal polymer in powder, granular or pellet form between said melting step and said heating step.

9. The method as set forth in claim 8 wherein said solidifed polymer is heated in said liquid medium at a temperature lower than the melting point of said polymer.

10. The method as set forth in claim 1 wherein said polyacetal polymer is a copolymer.

11. The method as set forth in claim 1 wherein 1 to 20 parts of said liquid medium are used per part by weight of polymer.

12. The method as set forth in claim 11 wherein 3 to 15 parts of said liquid medium are used per part by weight of polymer.

13. The method as set forth in claim 1 wherein said heterogeneous system contains liquid polymer and liquid medium.

* * * * *